Patented July 10, 1951

2,559,584

UNITED STATES PATENT OFFICE 2,559,584

SOLID COMPOSITIONS CONTAINING POLYOXYETHYLENE ALIPHATIC AMINES AND AMIDES

George E. Barker, Wilmington, Del., assignor to Atlas Powder Company, Wilmington, Del., a corporation of Delaware No Drawing. Application January 23, 1948, Serial No. 4,081

17 Claims. (Cl. 252—152)

1

The present invention relates to solid compositions containing polyoxyethylene aliphatic amines or amides.

An object of the invention is to provide a solid composition containing a polyoxyethylene aliphatic amine or amide.

Another object is to provide a method for solidifying a normally liquid to soft waxy polyoxyethylene aliphatic amine or amide.

A further object is to provide a solid detergent composition containing a normally liquid to soft waxy polyoxyethylene aliphatic amine or amide having detergent properties.

A still further object is to provide means for controlling the rate of solution of a water-soluble polyoxyethylene aliphatic amine or amide detergent composition by incorporating it into a solid composition which can be formed into the shape of bars or the like and used after the fashion of hard soap.

The above and other objects will become more fully apparent in the course of the following description.

Polyoxyethylene aliphatic amines and amides constitute a class of increasingly valuable chemical materials. In this class are emulsifiers, detergents, surface active agents, solvents, conditioning agents, and the like. A number of the compounds in this class are liquids or are soft waxy materials under ordinary conditions. It is well known in the art that the consistency of such compounds depends on the number of oxyethylene groups and on the carbon chain length and nature of any radicals attached to the oxyethylene group. While it is therefore possible to find individual compounds which are normally solid, it frequently happens that for a particular use the preferable, and often the only operative compounds, or normally liquid or soft waxy substances. It is desirable for some end uses of these polyoxythylene compounds to have them in solid form, for example, in molded bars, tablets, chips, or powders. The conventional solution to such a problem is generally either to absorb the liquid or soft material in a solid carrier or to dissolve in the material some substances which will increase its body or cause it to gel. There are objections to these approaches to the problem, particularly in that physically suitable absorbents or bodying agents are often unsuitable for the intended end use of the polyoxyethylene compound, or undesirable proportions of the absorbent or bodying agent may be required.

In accordance with the present invention, it has been discovered that many of the normally liquid to soft waxy polyoxyethylene aliphatic amines and amides form solid mixtures with urea. The scientific explanation of this phenomenon is not known but it is believed to be quite different from the action of absorbents or bodying or gelling agents referred to above. The effect is specific to certain classes of the polyoxyethylene compounds. On mixing together a quantity of finely divided solid urea and one of the operative polyoxyethylene compounds, the product is initially a soft, moldable mixture, but on standing for a short time, the mixture undergoes concretion and sets up to a solid mass which can be used as such or reduced to smaller pieces. As they set up, many of the compositions show a marked increase in volume which is often sufficient in extent, for example, to cause the breakage of a glass beaker containing the composition. The solidification or concretion is not associated with loss of water. In some specific embodiments of the invention, compositions made with substantial quantities of water solidify without appreciable loss of weight. The final concreted product is not heat softened until the temperature is raised to about the melting point of the urea.

One of the most valuable features of the invention at the present time resides in the preparation in solid form of some of the more valuable polyoxyethylene aliphatic amine or amide detergent compounds which are normally liquids or soft waxes. By means of the invention, these detergents can be prepared in bar, chipped or granulated form. The urea in the composition is water-soluble and unobjectionable for this end use. Additives such as inorganic soap builders, foaming agents, emollients, supplementary detergents, germicides, etc., can be included in the compositions to impart their conventional properties.

Other typical end uses for the compositions of the invention are in various emulsifying operations, as in cosmetic and pharmaceutical manufacture, the preparation of petroleum oil emulsions, textile conditioning and lubricating emulsions, insecticidal and fungicidal emulsions, and the like. In some of these uses the urea serves a recognized purpose, for example, as a stabilizer or antacid. By means of the invention, the normally liquid or soft waxy polyoxyethylene aliphatic amines or amides can be used in solid form with substantial advantages in packaging, handling and measurement. Molded, pressed or cut pieces can be readily prepared to contain any desired constant quantity of the polyoxyethylene compound so that accurate quantities can be measured by the user by simple count and without weighing or making a volume measurement.

The polyoxyethylene amines referred to herein may be represented by the formula:

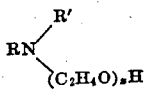

Wherein R is an aliphatic hydrocarbon group containing from 16 to 30 carbon atoms, R' is H or $(C_2H_4O)_yH$, $y$ being a whole number, and $x$ is a whole number, the total of $x$ and $y$ being at least 2. These compounds are preferably produced by reacting an aliphatic amine and ethylene oxide. In such a reaction, the value of $(x+y)$ in the formula equals the number of molecules of ethylene oxide reacted with each molecule of the amine. It will be understood that this reaction produces a mixed product and may involve one or both of the amino hydrogen atoms of the amine reactant.

Typical polyoxyethylene amines are polyoxyethylene hexadecyl amine with 2 oxyethylene groups per mol; polyoxyethylene octadecyl amine with 5 oxyethylene groups per mol; polyoxyethylene octadecyl amine with 50 oxyethylene groups per mol; polyoxyethylene octadecenyl amine with 3 oxyethylene groups per mol; polyoxyethylene octadecenyl amine with 50 oxyethylene groups per mol; polyoxyethylene octadecadienyl amine with 12 oxyethylene groups per mol; polyoxyethylene eicosyl amine with 20 oxyethylene groups per mol; polyoxyethylene triacontyl amine with 2 oxyethylene groups per mol; polyoxyethylene triacontyl amine with 100 oxyethylene groups per mol.

The polyoxyethylene amides referred to herein may be represented by the formula:

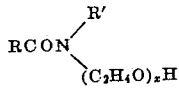

wherein R is an aliphatic hydrocarbon group containing from 9 to 29 carbon atoms, R' is H or $(C_2H_4O)_yH$, $y$ being a whole number, and $x$ is a whole number the total of $x+y$ being at least 5.

Typical polyoxyethylene amides are polyoxyethylene capric amide containing 5 oxyethylene groups; polyoxyethylene lauric amide containing 25 oxyethylene groups; polyoxyethylene palmitic amide containing 8 oxyethylene groups; polyoxyethylene stearic amide containing 30 oxyethylene groups; polyoxyethylene behenic amide containing 20 oxyethylene groups; polyoxyethylene oleic amide containing 12 oxyethylene groups; polyoxyethylene linoleic amide containing 16 oxyethylene groups; polyoxyethylene ricinoleic amide containing 12 oxyethylene groups; polyoxyethylene melissic amide containing 5 oxyethylene groups; and polyoxyethylene melissic amide containing 200 oxyethylene groups.

The polyoxyethylene amines and amides referred to above belong to well-known chemical classes and many of the specific members of the classes have been described in the literature. The compounds can be prepared by various conventional methods but the preferred process consists in the reaction of ethylene oxide and the selected amine or amide under conditions of moderately elevated pressure and temperature.

The polyoxyethylene amines and amides can also be prepared by reacting polyethylene glycols or reactive derivatives thereof with the selected amines or amides or suitable reactive derivatives thereof.

As prepared commercially, the polyoxyethylene amines and amides are invariably mixtures of related compounds of the same chemical types, due to the use of commercial grade ingredients and to the use of the ethylene oxide reaction or of commercial mixtures of polyethylene glycols. The use of the term "compound" in this specification and in the claims is for purpose of convenience and is not to be taken as exclusive of mixtures of compounds.

It will be noted that in describing the polyoxyethylene compounds, the minimum number of oxyethylene groups is stated but not the maximum number. This is for the reason that the solidification phenomenon with urea on which the invention is based occurs with all the higher polyoxyethylene compounds. It is well known that these polyoxyethylene compounds become harder waxes as the number of oxyethylene groups is increased. The number of oxyethylene groups at which a given hardness is exhibited will depend on the chemical nature and also the size of the radicals to which the polyoxyethylene chains are bonded. The upper limit of the number of oxyethylene groups in the compounds useful in the invention does not depend on a loss of solidification tendency with urea, but is a practical limit depending on the intended use of the composition. For example, if the property desired is merely physical hardness, it would be unnecessary to use the invention in the upper ranges of oxyethylene content because there the compounds have the requisite hardness. On the other hand, if the object is to reduce the rate of solution in water, it may be desirable to use the invention even with those ethers which are hard waxes at the temperatures prevailing in the intended use.

A particularly useful sub-group of the polyoxyethylene amines and amides useful in this invention comprises those which are water-soluble. By forming the mixture of urea and a water-soluble polyoxyethylene amine or amide into a relatively large shaped body such as a cake or bar, the rate of solution of the polyoxyethylene compound in water is greatly retarded. This makes it possible to use those compounds which have valuable detergent proporties in the form of a bar which can be used like bar soap even though the water solubility of the ether far exceeds that of soap.

The compositions of the invention can be made by either of two methods. In the first method the selected polyoxyethylene compound is intimately mixed with finely divided urea forming a soft moldable mixture which is then set aside and allowed to set-up. In this method the urea is employed in solid form and the polyoxyethylene amine or amide is used cold if it is normally liquid, or is warmed to reduce it to the liquid state if it is a normally waxy material. The aging or setting-up stage of this method may occupy from a few hours to several days time, depending on the particular compound used and the proportions of polyoxyethylene compound and urea.

In the second method for practising the invention, the urea is carefully melted and the polyoxyethylene amine or amide intimately mixed with the molten urea. Care must be taken in this method not to over-heat the urea since it readily decomposes. This method is best practised by heating the urea under carefully controlled conditions such as in an oil bath and rapidly mixing in the polyoxyethylene compound to form the mixture. After mixing, the composition can be poured into suitable molds and allowed to solidify.

The end products of the two methods appear to be essentially the same. The second method does not require the prolonged setting-up period required by the first method. However, the same limitations on the polyoxyethlyene amines and amides have been observed to apply to both methods of making the compositions.

The proportions of polyoxyethylene compound and urea may be varied within fairly wide limits. There is a limit to the proportion of liquid or soft polyoxyethylene compound that may be used to obtain the solid compositions of the invention. The exact value of this limit depends on the particular compound. In general, the best compositions of this inveniton are found in the range 50 to 90% urea and 50 to 10% polyoxyethylene amine or amide. Especially useful compositions have been found in the approximate proportion of 70% urea and 30% polyoxyethylene compound.

The following table sets forth several examples of solid compositions in accordance with the invention. The tabulated examples were carried out in accordance with the first method described above. In each case finely divided urea in the indicated quantity was placed in a mixing bowl and the polyoxyethylene amine or amide was slowly added in liquid form (melted if necessary (while stirring with a motor-driven stirrer to obtain adequate mixing. After mixing was completed, the compositions were placed in containers and set aside to harden. Under the heading "remarks," the table indicates the time at which the composition was observed to have set-up.

Solid compositions from urea and polyoxyethylene amines and amides

| Example | Polyoxyethylene Compound | Urea Quantity (Grams) | Quantity (Grams) | Remarks |
|---|---|---|---|---|
| 1 | Polyoxyethylene octadecyl amine, averaging 10 oxyethylene groups per mol | 30 | 70 | Cake hard after 5 days. |
| 2 | Polyoxyethylene amines from a commercial mixture of approximately 30% hexadecyl amine, 25% octadecyl amine and 45% octadecenyl amine, the polyoxyethylene compounds averaging 4.8 oxyethylene groups per mol. | 30 | 70 | Do. |
| 3 | Polyoxyethylene amines from the same commercial mixture as in Example 2, but averaging 10 oxyethylene groups per mol. | 30 | 70 | Do. |
| 4 | Polyoxyethylene amines from the same commercial mixture as in Example 2, but averaging 15 oxyethylene groups per mol. | 30 | 70 | Do. |
| 5 | Polyoxyethylene amines from the same commercial mixture as in Example 2, but averaging 20 oxyethylene groups per mol. | 30 | 70 | Do. |
| 6 | Polyoxyethylene amines from the same commercial mixture as in Example 2, but averaging 50 oxyethylene groups per mol. | 30 | 70 | Do. |
| 7 | Polyoxyethylene amines from a commercial mixture of approximately 10% hexadecyl amine, 10% octadecyl amine, 35% octadecenyl amine, and 45% octadecadienyl amine, the polyoxyethylene compounds averaging 3 oxyethylene groups per mol. | 30 | 70 | Do. |
| 8 | Polyoxyethylene amines from the same commercial mixture as in Example 7, but averaging 12 oxyethylene groups per mol. | 30 | 70 | Do. |
| 9 | Polyoxyethylene amines from the same commercial mixture as in Example 7, but averaging 50 oxyethylene groups per mol. | 30 | 70 | Cake hard after 3 days. |
| 10 | Polyoxyethylene oleic amide averaging 16 oxyethylene groups per mol | 30 | 70 | Cake hard after 4 days. |
| 11 | Polyoxyethylene capric amide averaging 5 oxyethylene groups per mol | 30 | 70 | Cake hard after 5 days. |
| 12 | Polyoxyethylene capric amide averaging 10 oxyethylene groups per mol | 30 | 70 | Do. |
| 13 | Polyoxyethylene lauric amide averaging 6 oxyethylene groups per mol | 30 | 70 | Cake hard after 4 days. |
| 14 | Polyoxyethylene lauric amide averaging 10 oxyethylene groups per mol | 30 | 70 | Do. |
| 15 | Polyoxyethylene lauric amide averaging 25 oxyethylene groups per mol | 30 | 70 | Do. |
| 16 | Polyoxyethylene palmitic amide averaging 8 oxyethylene groups per mol | 30 | 70 | Cake hard after 5 days. |
| 17 | Polyoxyethylene palmitic amide averaging 8 oxyethylene groups per mol | 30 | 70 | Do. |
| 18 | Polyoxyethylene palmitic amide averaging 12 oxyethylene groups per mol | 30 | 70 | Do. |
| 19 | Polyoxyethylene commercial amide mixture composed of approximately 30% palmitic amide, 25% stearic amide and 45% oleic amide, the polyoxyethylene compounds averaging 8 oxyethylene groups per mol. | 30 | 70 | Cake hard after 3 days. |
| 20 | Polyoxyethylene amides from the same commercial amide mixture as in Example 19, but averaging 12 oxyethylene groups per mol. | 30 | 70 | Do. |
| 21 | Polyoxyethylene amides from the same commercial amide mixture as in Example 19, but averaging 16 oxyethylene groups per mol. | 30 | 70 | Cake hard after 4 days. |
| 22 | Polyoxyethylene commercial amide mixture composed of approximately 25% palmitic amide, 70% stearic amide and 5% oleic amide, the polyoxyethylene compounds averaging 8 oxyethylene groups per mol. | 30 | 70 | Cake hard after 1 day. |
| 23 | Polyoxyethylene amides from the same commercial amide mixture as in Example 22, but averaging 12 oxyethylene groups per mol. | 30 | 70 | Do. |
| 24 | Polyoxyethylene amides from the same commercial amide mixture as in Example 22, but averaging 16 oxyethylene groups per mol. | 30 | 70 | Do. |
| 25 | Polyoxyethylene amides from the same commericial amide mixture as in Example 22, but averaging 30 oxyethylene groups per mol. | 30 | 70 | Do. |
| 26 | Polyoxyethylene commercial amide mixture composed of approximately 20% stearic amide, 60% oleic amide, and 20% linoleic amide, the polyoxyethylene compounds averaging 8 oxyethylene groups per mol. | 30 | 70 | Cake hard after 5 days. |
| 27 | Polyoxyethylene amides from the same commercial amide mixture as in Example 26, but averaging 12 oxyethylene groups per mol. | 30 | 70 | Cake hard after 3 days. |
| 28 | Polyoxyethylene amides from the same commercial amide mixture as in Example 26, but averaging 20 oxyethylene groups per mol. | 30 | 70 | Cake hard after 1 day. |

The polyoxyethylene compounds and mixtures referred to in the foregoing examples were prepared by reacting the stated amine, amide or mixtures with ethylene oxide in the indicated mol ratios.

The second formulating method for preparing the compositions of the invention is illustrated in the following two examples.

EXAMPLE 29

Heat 140 grams urea to 132 to 135° C. in a tall beaker set in an oil bath. When the urea is almost completely melted, add 60 grams polyoxyethylene octadecyl amine containing an average of 10 oxyethylene groups per mol, and stir the mixture mechanically until uniform. Then pour the mixture into molds and allow it to cool. On cooling, the mixture solidifies and can be ejected from the molds. Avoid overheating and prolonged heating of the urea to avoid decomposition.

EXAMPLE 30

Melt together 130 grams urea and 5 grams sodium carboxymethyl cellulose by heating to 132 to 135° C. on an oil bath. With rapid mechanical agitation, add to the melt 60 grams polyoxyethylene oleic amide, containing an average of 16 oxyethylene groups per mol, and 5 grams lanolin. Continue agitation until the mixture is uniform and then pour into molds and allow to cool. The mixture solidifies on cooling and can be ejected from the molds.

It is to be understood that the hot melt technique illustrated by the last two examples may be applied as well to the production of the other compositions included within the scope of the invention. Where satisfactory arrangements are available for carefully melting the urea and rapidly mixing the other ingredients, the hot melt method will be preferable. An obvious advantage of the hot melt method is the reduction of the duration of the setting up period which, in the case of the compositions produced by the cold method, may require storage for periods up to several days. However, the cold method involves a much simpler mixing operation and, for this reason, may be preferred in many cases.

The foregoing examples illustrate a wide range of compositions according to the invention. The invention is not, however, to be taken as limited to the specific ingredients, proportions or preparatory methods given by way of example. The invention may be practised using mixtures of polyoxyethylene amines and polyoxyethylene amides.

What is claimed is:

1. A composition consisting essentially of the solid concretion product of urea and at least one normally liquid to soft waxy polyoxyethylene compound selected from the group consisting of polyoxyethylene aliphatic amines containing from 16 to 30 carbon atoms in the aliphatic group and containing at least 2 oxyethylene groups, and polyoxyethylene aliphatic amides containing from 10 to 30 carbon atoms in their acyl group and having at least 5 oxyethylene groups per mol; said solid concretion product containing at least 10 per cent by weight of said polyoxyethylene compound.

2. A composition consisting essentially of the solid concretion product of urea and at least one normally liquid to soft waxy polyoxyethylene aliphatic amine containing from 16 to 30 carbon atoms in the aliphatic group and having at least 2 oxyethylene groups; said solid concretion product containing at least 10 per cent by weight of said polyoxyethylene compound.

3. A composition as defined in claim 2, wherein the said polyoxyethylene aliphatic amine is water-soluble.

4. A composition consisting essentially of the solid concretion product of urea and normally liquid to soft waxy polyoxyethylene amines from a mixture of approximately 30% hexadecyl amine, 25% octadecyl amine and 45% octadecenyl amine, said polyoxyethylene amines averaging from 4.8 to 50 oxyethylene groups per mol; said solid concretion product containing at least 10 per cent by weight of said polyoxyethylene amines.

5. A composition consisting essentially of the solid concretion product of urea and at least one normally liquid to soft waxy polyoxyethylene aliphatic amide containing from 10 to 30 carbon atoms in the acyl group and having at least 5 oxyethylene groups per mol; said solid concretion product containing at least 10 per cent by weight of said polyoxyethylene compound.

6. A composition as defined in claim 4 wherein the said polyoxyethylene aliphatic amide is water-soluble.

7. A composition consisting essentially of the solid concretion product of urea and a polyoxyethylene lauric amide containing from about 6 to 25 oxyethylene groups per mol; said solid concretion product containing at least 10 per cent by weight of said polyoxyethylene lauric amide.

8. A composition consisting essentially of the solid concretion product of urea and polyoxyethylene amides from a mixture of approximately 20% stearic amide, 60% oleic amide and 20% linoleic amide, said polyoxyethylene amides averaging from 8 to 20 oxyethylene groups per mol; said solid concretion product containing at least 10 per cent by weight of said polyoxyethylene amides.

9. A solid composition consisting essentially of the concretion product of from 50 to 10% by weight of at least one normally liquid to soft waxy polyoxyethylene compound selected from the group consisting of polyoxyethylene aliphatic amines having from 16 to 30 carbon atoms in the aliphatic group and having at least 2 oxyethylene groups per mol, and polyoxyethylene aliphatic amides containing from 10 to 30 carbon atoms in the acyl groups and having at least 5 oxyethylene groups per mol; and from 50 to 90% by weight urea.

10. A solid composition as defined in claim 9 wherein the said polyoxyethylene compound is water-soluble.

11. A solid composition as defined in claim 9 wherein the said concretion product consists of about 30% by weight of the said polyoxyethylene compound and about 70% by weight urea.

12. The method which comprises intimately admixing urea and at least one normally liquid to soft waxy polyoxyethylene compound selected from the group consisting of polyoxyethylene aliphatic amines containing from 16 to 30 carbon atoms in the aliphatic group and having at least 2 oxyethylene groups per mol and polyoxyethylene aliphatic amides containing from 10 to 30 carbon atoms in the acyl groups and having at least 5 oxyethylene groups per mol; the quantity of urea so admixed being sufficient to combine with said polyoxyethylene compound to form a concreted mixture and allowing the mixture to set-up to solid form.

13. The method defined in claim 12 wherein the said urea is employed in the proportion of from 50 to 90% by weight and the said polyoxyethylene compound is employed in the proportion of from 50 to 10% by weight.

14. The method which comprises intimately admixing finely divided solid urea and at least one normally liquid to soft waxy polyoxyethylene compound selected from the group consisting of polyoxyethylene aliphatic amines containing from 16 to 30 carbon atoms in the aliphatic groups and having at least 2 oxyethylene groups per mol, and polyoxyethylene aliphatic amides containing from 10 to 30 carbon atoms in the acyl groups and having at least 5 oxyethylene groups per mol; the quantity of urea so admixed being sufficient to combine with said polyoxyethylene compound to form a concreted mixture and allowing the mixture to set-up to solid form.

15. The method defined in claim 14 wherein the said urea is employed in the proportion of from 50 to 90% by weight and the said polyethylene compound is employed in the proportion of from 50 to 10% by weight.

16. The method which comprises intimately admixing molten urea and at least one normally liquid to soft waxy polyoxyethylene compound selected from the group consisting of polyoxyethylene aliphatic amines containing from 16 to 30 carbon atoms in the aliphatic groups and having at least 2 oxyethylene groups per mol; and polyoxyethylene aliphatic amides containing from 10 to 30 carbon atoms in the acyl groups and having at least 5 oxyethylene groups per mol; the quantity of urea so admixed being sufficient to combine with said polyoxyethylene compound to form a concreted mixture and allowing the mixture to set-up to solid form.

17. The method defined in claim 16, wherein the said urea is employed in the proportion of from 50 to 90% by weight and the said polyoxyethylene compound is employed in the proportion of from 50 to 10% by weight.

GEORGE E. BARKER.

REFERENCES CITED

The following references are of record in the file of this patent:

UNITED STATES PATENTS

| Number | Name | Date |
|---|---|---|
| 2,085,706 | Schoeller et al. | June 29, 1937 |
| 2,174,762 | Schuette et al. | Oct. 3, 1939 |
| 2,374,187 | Flett | Apr. 24, 1945 |

FOREIGN PATENTS

| Number | Country | Date |
|---|---|---|
| 443,795 | Great Britain | Mar. 6, 1936 |
| 469,334 | Great Britain | July 23, 1937 |

Certificate of Correction

Patent No. 2,559,584

July 10, 1951

GEORGE E. BARKER

It is hereby certified that error appears in the printed specification of the above numbered patent requiring correction as follows:

Column 1, line 39, for "or", first occurrence, read *are*; line 41, for "polyoxythylene" read *polyoxyethylene*; column 5, line 63, for "inveniton" read *invention*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*